United States Patent [19]

Pettit, Jr.

[11] 3,998,768

[45] Dec. 21, 1976

[54] THERMOSETTING POWDER COATING COMPOSITION OF A BLEND OF ACRYLIC POLYMERS HAVING DIFFERENT GLASS TRANSITION TEMPERATURES AND A BLOCKED POLYISOCYANATE CROSS-LINKING AGENT

[75] Inventor: Paul H. Pettit, Jr., Wilmington, Del.

[73] Assignee: E. I. Du Pont de Nemours and Company, Wilmington, Del.

[22] Filed: Dec. 24, 1974

[21] Appl. No.: 536,321

[52] U.S. Cl. .............................. 260/17 R; 260/31.6; 260/37 N; 260/42.15; 260/42.29; 260/42.52; 260/77.5 CR; 260/77.5 TB; 260/827; 260/859 R; 260/901; 526/320

[51] Int. Cl.² .................. C08K 5/10; C08L 1/14; C08L 33/14; C08L 75/04

[58] Field of Search ..... 260/77.5 CR, 31.6, 31.8 N, 260/901, 17 R, 77.5 TB, 859 R; 106/193 J, 308 C

[56] References Cited

UNITED STATES PATENTS

| | | | |
|---|---|---|---|
| 2,649,382 | 8/1953 | Vesce | 106/193 J |
| 3,676,405 | 7/1972 | Labana | 260/77.5 CR |
| 3,694,389 | 9/1972 | Levy | 260/77.5 CR |
| 3,770,848 | 11/1973 | Labana et al. | 260/901 |
| 3,784,501 | 1/1974 | Pettit | 260/31.6 |
| 3,823,205 | 7/1974 | Zimmt | 260/901 |
| 3,853,822 | 12/1974 | Brod et al. | 260/77.5 CR |
| 3,857,818 | 12/1974 | Frizelle | 260/77.5 CR |
| 3,931,117 | 1/1976 | Leonard | 260/77.5 TB |

FOREIGN PATENTS OR APPLICATIONS

| | | |
|---|---|---|
| 1,265,634 | 3/1972 | United Kingdom |
| 1,320,657 | 6/1973 | United Kingdom |

OTHER PUBLICATIONS

*Paint Manufacturing*, July/Aug. 1974, pp. 16, 17 & 27.

Primary Examiner—Allan Lieberman

[57] ABSTRACT

A thermosetting polymer powder coating composition comprising finely divided powder particles that have a diameter of about 1–100 microns wherein the powder particles are a blend of
A. a hard acrylic polymer having a high glass transition temperature;
B. a soft acrylic polymer having a low glass transition temperature;
C. a blocked organic polyisocyanate;
D. a hydroxy functional plasticizer; and
E. catalytic amount of an organometallic compound;
the thermosetting powder coating composition is particularly useful as an exterior finish for automobile and truck bodies.

12 Claims, No Drawings

THERMOSETTING POWDER COATING COMPOSITION OF A BLEND OF ACRYLIC POLYMERS HAVING DIFFERENT GLASS TRANSITION TEMPERATURES AND A BLOCKED POLYISOCYANATE CROSS-LINKING AGENT

BACKGROUND OF THE INVENTION

1. Field of the Invention

This invention is related to powder coating compositions and in particular, to a thermosetting polymer powder coating composition.

2. Description of the Prior Art

To curb pollution caused by conventional solvent based coating systems, the automobile and truck manufacturing industry intends to utilize powder coating compositions. However, the industry demands that these powder coating compositions be of a high quality.

Thermosetting powder coating compositions of polyester resins cross-linked with polyisocyanates are well known in the art as shown in British Pat. No. 1,265,634, published Mar. 1, 1972 and British Pat. No. 1,320,657, published June 20, 1973. In general, these polyester powder coatings do not have the high level of outdoor durability that is required for exterior use on automobile and truck bodies. Powders of acrylic polymers cross-linked with aromatic polyisocyanates are known as shown in Labana U.S. Pat. No. 3,676,405, but coatings from these powders would have poor exterior durability. In addition, the thermosetting powders heretofore known in the art have a poor appearance caused by inadequate flow of the finish during baking. The above defects make the compositions unacceptable for an exterior finish for automobile and truck bodies.

SUMMARY OF THE INVENTION

The thermosetting polymer powder coating composition of this invention comprises finely divided particles that have a particle size of 1–100 microns; the particles are an intimate blend of the following constituents:

A. 20–70% by weight of a hard acrylic polymer of
  1. 80–95% by weight, based on the weight of the acrylic polymer, of methyl methacrylate, styrene or a mixture of methyl methacrylate and styrene;
  2. 5–20% by weight, based on the weight of the acrylic polymer, of a hydroxyalkyl acrylate or a hydroxyalkyl methacrylate that have 2–4 carbon atoms in the alkyl groups or a mixture of the above acrylate or methacrylate;

wherein the hard acrylic polymer has a glass transition temperature of about 70°–103° C. and a weight average molecular weight of 5,000–20,000;

B. 5–20% by weight of a soft acrylic polymer of
  1. 30–62% by weight, based on the weight of the soft acrylic polymer, of methyl methacrylate; styrene or a mixture of methyl methacrylate and styrene;
  2. 35–60% by weight, based on the weight of the soft acrylic polymer, of an alkyl acrylate having 2–12 carbon atoms in the alkyl group, an alkyl methacrylate having 4–12 carbon atoms in the alkyl group or a mixture of the above;
  3. 3–10% by weight of a hydroxyalkyl methacrylate, a hydroxyalkyl acrylate each having 2–4 carbon atoms in the alkyl groups or a mixture of the above;

wherein the soft acrylic polymer has a glass transition temperature of about −20° to 15° C. and a weight average molecular weight of about 5,000–50,000;

C. 15–30% by weight of a blocked organic polyisocyanate;

D. 10–30% by weight of a hydroxy functional plasticizer having a hydroxyl number of 18–300 and a number average molecular weight of about 500–6,000; and E. a catalytic amount of an organometallic compound.

DESCRIPTION OF THE INVENTION

The thermosetting powder coating composition of this invention has a sufficiently high glass transition temperature to maintain a free-flowing powder and has sufficiently low melt viscosity to flow to an exceptionally smooth, glossy finish. The finish is of a high quality and has a good appearance and good physical properties as is required for the exterior finishes of automobile and truck bodies.

The thermosetting powder coating composition of this invention has powder particles that have a diameter of about 1–100 microns and preferably the powder particles are 10 to 75 microns in diameter to provide a high quality finish.

The particle size of the powder coating is determined by the direct measurement of the diameter of the individual particles under a microscope or by a Coulter Counter Instrument.

The powder particles of the powder coating can contain pigment or can be unpigmented to provide a clear finish. Generally, the powder particles are pigmented and contain up to 60% by weight, based on the weight of unpigmented powder coating, of pigment. Pigmentation can be as low as 1.0% by weight. Any of the conventional inorganic pigments, metallic powders and flakes, organic dyes, organic pigments, and lakes can be used.

The hard acrylic polymer and the soft acrylic polymer are chosen so that there is borderline incompatibility between the polymers. This is readily observed in an electron micrograph of an unpigmented coalesced cured or uncured film of the powder wherein discrete areas of soft acrylic polymer are noted in the hard acrylic polymer film. If the polymers are completely incompatible, a stable powder cannot be formed and the film properties of the powder are poor.

About 20–70% by weight of the hard acrylic polymer is utilized in the powder coating composition. Also, blends of different hard acrylic polymers can be used. The hard acrylic polymer has a weight average molecular weight of about 5,000 to 20,000 and preferably 6,000 to 17,000 to form a high quality powder. The hard acrylic polymer has a glass transition temperature of 70° to 103° C. and preferably 80° to 102° C. and a hydroxyl content of about 0.5–3% by weight and preferably a hydroxyl content which provides good reactivity of the polymer of 1.0–1.8% by weight.

The powder contains about 5–20% by weight of the soft acrylic polymer has a weight average molecular weight of about 5,000 to 50,000, and preferably, 10,000 to 30,000 to form a good quality composition. The soft acrylic polymer has a glass transition temperature of −20° to 15° C. and a hydroxyl content of about 0.5–2% by weight, and preferably, 0.5–1.5% by weight for good reactivity with the isocyanate constituent.

The weight average molecular weight of the acrylic polymers are determined by gel permeation chromotography using polymethyl methacrylate or polystyrene as the standard.

Both the hard and soft acrylic polymers are prepared by conventional solution, emulsion or bead polymerization techniques and by using conventional polymerization catalysts.

The acrylic polymers can be prepared by conventional solution polymerization techniques in which the monomer constituents are blended with solvents and a polymerization catalyst and the reaction mixture is heated to 55°–150° C. for about 2–6 hours to form a polymer that has the aforementioned weight average molecular weight.

Typical solvents which are used to prepare the acrylic polymers are toluene, ethyl acetate, acetone, methylisobutyl ketone, methylethyl ketone, ethyl alcohol, and other esters, ethers, ketones, and alcohols, such as are conventionally used. Solvents having a boiling point below 100° C. are perferred to facilitate spray drying of a formulated composition or solvent removal from a formulated composition by vacuum stripping to form the powder coating composition. Preparation of a formulated composition used to form the powder coating composition is discussed hereinafter.

About 0.1–4% by weight, based on the weight of the monomers, of a polymerization catalyst is used to prepare the acrylic polymers. Typical catalysts are azo-bis-(α,gamma-dimethyl-valeronitrile), benzoyl peroxide, t-butyl peroxy pivalate, azobisisobutyronitrile and the like. Up to about 5% by weight of a chain transfer agent can be used to control the molecular weight such as dodecyl mercaptan or mercaptoethanol which is preferred to provide acrylic polymers with terminal hydroxyl groups.

The acrylic polymers can be prepared by an emulsion polymerization process as disclosed in U.S. Pat. No. 3,790,513. The acrylic polymer can also be prepared by suspension or bead polymerization techniques as disclosed in W. R. Sorenson and T. W. Campbell, *Preparative Methods of Polymer Chemistry*, Interscience Publishers, New York, 2nd Ed. 1968, page 254.

The hard acrylic polymer utilized in the novel powder coating composition of this invention contains about 80–95% by weight of methyl methacrylate or styrene or a mixture of methyl methacrylate styrene, and optionally, up to 10% by weight of an alkyl methacrylate or an alkyl acrylate having 2–14 carbon atoms in the alkyl groups and 5–20% by weight of a hydroxy alkyl methacrylate or a hydroxy alkyl acrylate each having 2–4 carbon atoms in the alkyl groups or mixtures thereof.

One preferred hard acrylic polymer that forms a good quality composition contains 82–94% by weight of methyl methacrylate, 1–10% by weight of the alkyl methacrylate or acrylate, 5–17% by weight of the hydroxy alkyl acrylate or methacrylate. One particularly useful hard acrylic polymer that forms a durable high quality finish is of methyl methacrylate, lauryl methacrylate, hydroxyethyl acrylate, or hydroxypropyl methacrylate. Another useful hard acrylic polymer is of methyl methacrylatic and hydroxypropyl methacrylate.

The soft acrylic used in the powder coating composition contains about 30–62% by weight of methyl methacrylate, styrene or a mixture of methyl methacrylate and styrene, 35–60% by weight of an alkyl acrylate having 2–12 carbon atoms in the alkyl group or an alkyl methacrylate having 4–12 carbon atoms in the alkyl group and 3–10% by weight of a hydroxy alkyl acrylate or a hydroxy alkyl methacrylate having 2–4 carbon atoms in the alkyl groups. One preferred soft acrylic polymer which forms an excellent finish contains 45–60% by weight of methyl methacrylate, 35–45% by weight of an alkyl acrylate having 4–8 carbon atoms in the alkyl group, and 5–10% by weight of hydroxy alkyl acrylate or a hydroxy alkyl methacrylate.

One particularly useful soft acrylic polymer contains methyl methacrylate, butyl acrylate and hydroxy ethyl acrylate.

Typical alkyl acrylates and alkyl methacrylates having 2–14 carbon atoms in the alkyl groups that can be used to prepare the acrylic polymers are as follows: ethyl acrylate, propyl acrylate, butyl acrylate, hexyl acrylate, 2-ethylhexyl acrylate, nonyl acrylate, decyl acrylate, lauryl acrylate, tetradecyl acrylate, ethyl methacrylate, propyl methacrylate, butyl methacrylate, isobutyl methacrylate, hexyl methacrylate, 2-ethylhexyl methacrylate, nonyl methacrylate, decyl methacrylate, lauryl methacrylate and tetradecyl methacrylate and the like.

Typical hydroxy alkyl acrylates and methacrylates which can be used to prepare the acrylic polymer are 2-hydroxyethyl acrylate, hydroxypropyl acrylate, hydroxybutyl acrylate, hydroxyethyl methacrylate, hydroxypropyl methacrylate, hydroxybutyl methacrylate, and the like. Hydroxyethyl acrylate and hydroxypropyl methacrylate are preferred.

Hydroxypropyl methacrylate, as commercially available, is a mixture of 2-hydroxypropyl methacrylate and 1-methyl-2-hydroxyethyl methacrylate. One useful mixture is of 68–75% by weight of 2-hydroxypropyl methacrylate and 25–32% by weight of 1-methyl-2-hydroxyethyl methacrylate. Also, hydroxypropyl acrylate, as commercially available, is a mixture of 2-hydroxy-1-propyl acrylate and 1-hydroxy-2-propyl acrylate.

Optionally, the powder coating composition of this invention can contain up to 20% by weight of cellulose acetate butyrate having a viscosity of 0.005–2.0 seconds measured according to ASTM-D-1343-56 at 25° C. and has butyryl content of about 30–60% by weight. Generally, 1–20% by weight of cellulose acetate butyrate is used, but to form a good quality composition, 2–10% by weight of a cellulose acetate butyrate that has a viscosity of 0.008–0.2 second and butyryl content of 50–55% is used. The cellulose acetate butyrate provides an excellent appearance to the finish prepared from the powder coating composition. Cellulose acetate also is useful as a dispersant for pigments which are used in the powder coating composition.

The power contains about 15–30% by weight of a blocked organic polyisocyanate blocked with an organic blocking agent.

A wide variety of aliphatic polyisocyanates, aromatic polyisocyanates, alicyclic polyisocyanates can be used in this invention. The following is a list of useful polyisocyanates:

propylene-1,2-diisocyanate,
butylene-1,2-diisocyanate,
butylene-1,3-diisocyanate,
hexamethylene diisocyanate,
octamethylene diisocyanate,
nonamethylene diisocyanate,
decamethylene diisocyanate, 2,11-diisocyanato-dodecane and the like,
meta-phenylene diisocyanate,
para-phenylene diisocyanate,
toluene-2,4-diisocyanate,
toluene-2,6-diisocyanate,
xylene-2,4-diisocyanate,
xylene-2,6-diisocyanate,
dialkyl benzene diisocyanates, such as methylpropylbenzene diisocyanate, methylethylbenzene diisocyanate, and the like;
2,2'-biphenylene diisocyanate,
3,3'-biphenylene diisocyanate,
4,4'-biphenylene diisocyanate,
3,3'-dimethyl-4,4'-biphenylene diisocyanate, and the like;
methylene-bis-(4-phenyl isocyanate),
ethylene-bis-(4-phenyl isocyanate),
isopropylidene-bis-(4-phenyl isocyanate),
butylene-bis-(4-phenyl isocyanate),
hexafluoroisopropylidene-bis-(4-phenyl isocyanate), and the like;
2,2'-oxydiphenyl diisocyanate,
3,3'-oxydiphenyl diisocyanate,
4,4'-oxydiphenyl diisocyanate, and the like;
2,2'-ketodiphenyl diisocyanate,
3,3'-ketodiphenyl diisocyanate,
4,4'-ketodiphenyl diisocyanate,
2,2'-thiodiphenyl diisocyanate,
3,3'-thiodiphenyl diisocyanate,
4,4'-thiodiphenyl diisocyanate, and the like;
2,2'sulfonediphenyl diisocyanate,
3,3'-sulfonediphenyl diisocyanate,
4,4'-sulfonediphenyl diisocyanate, and the like;
2,2'-methylene-bis-(cyclohexyl isocyanate),
3,3'-methylene-bis-(cyclohexyl isocyanate),
4,4'-methylene-bis-(cyclohexyl isocyanate),
4,4'-ethylene-bis-(cyclohexyl isocyanate),
4,4'-propylene-bis-(cyclohexyl isocyanate),
bis-(para-isocyanato-cyclohexyl)sulfide,
bis-(para-isocyanato-cyclohexyl)sulfone,
bis-(para-isocyanato-cyclohexyl)ether,
bis-(para-isocyanato -cyclohexyl)diethyl silane,
bis-(para-isocyanato-cyclohexyl)diphenyl silane,
bis-(para-isocyanato-cyclohexyl)ethyl phosphine oxide,
bis-(para-isocyanato-cyclohexyl)phenyl phosphine oxide,
bis-(para-isocyanato-cycloxhexyl)N-phenyl amine,
bis-(para-isocyanato-cyclohexyl)N-methyl amine,
2,6-diisocyano-pyridine,
bis-(4-isocyanato-phenyl)diethyl silane,
bis-(4-isocyanato-phenyl)diphenyl silane,
dichloro-biphenylene diisocyanate,
bis-(4-isocyanato-phenyl)ethyl phosphone oxide,
bis-(4-isocyanato-phenyl)phenyl phosphine oxide,
bis-(4-isocyanato-phenyl)N-phenyl amine,
bis-(4-isocyanato-phenyl)N-methyl amine,
3,3'-dimethyl-4,4'-diisocyanato biphenyl,
3,3'-dimethoxy-biphenylene diisocyanate
2,4-bis-(β-isocyanato-t-butyl)toluene,
bis-(para-β-isocyanato-t-butyl-phenyl)ether,
para-bis-(2-methyl-4-isocyanato-phenyl)benzene,
3,3'-diisocyanato adamantane,
3,3'-diisocyanato biadamantane,
3,3'-diisocyanatoethyl-1,1'-biadamantane,
1,2-bis-(3isocyanato-propoxy)ethane,
2,2'dimethyl propylene diisocyanate,
3-methoxy-hexamethylene diisocyanate,
2,5-dimethyl heptamethylene diisocyanate,
5-methyl-nonamethylene diisocyanate,
1,4-diisocyanato-cyclohexane,
1,2-diisocyanato-octadecane,
2,5-diisocyanato-1,3,4-oxadiazole.
OCN(CH$_2$)$_3$ O(CH$_2$)$_2$ O(CH$_2$)$_3$ NCO,
OCN(CH$_2$)$_3$ S(CH$_2$)$_3$ NCO,
OCN(CH$_2$)$_3$ N(CH$_2$)$_3$ NCO,
polymethylene polyphenyl isocyanate,
isophorone diisocyanate which is 3-isocyanatomethyl 3,5,5-trimethyl cyclohexyl isocyanate and

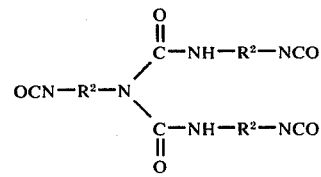

where R$^2$ is an alkylene group having 2–6 carbon atoms,
wherein one preferred type is the biuret of hexamethylene diisocyanate which is a good cross-linking agent.

For extended outdoor weatherability and durability, aliphatic and cycloaliphatic polyisocyanates should be used and polyisocyanates containing aromatic radicals should not be utilized in the composition. Preferred polyisocyanates which provide weatherability and durability are isophorone diisocyanate and 4,4'methylene-bis-(cyclohexyl isocyanate).

As mentioned above, blocked polyisocyanates are used in the coating composition of this invention. The obvious reason for using blocked polyisocyanates is that the powder composition will remain stable and free-flowing for long periods of time since the isocyanate groups are in combination with a blocking agent and therefore will not react until sufficient heat is applied to release the blocking agent.

Any of the aforementioned polyisocyanates reacted with another chemical compound to form a thermally unstable reaction product can be utilized. This reaction product (blocked organic polyisocyanate) must be stable below 50° C. for long periods of time and must be compatible with the other constituents used in the powder coating composition. However, this product must break down under moderate baking conditions, for example, 125°–200° C. to form a polyisocyanate with reactive isocyanate groups that will cross-link with other constituents in the powder coating composition.

Typical blocking agents that can be used to form the blocked organic polyisocyanate used in the powder coating composition are, for example, phenol compounds, alkyl acetoacetates, ketoximes, dialkyl malonates, caprolactam, and the like. Typical phenol compounds that can be used are phenol, propyl phenol, tertiary butyl phenol, nonyl phenol, other monohydric phenols, bromo phenol, 2-chloro phenol, dichloro phenol, 2-methoxy nitrophenol and the like. Preferably, ketoximes are used as blocking agents for the blocked polyisocyanate used in this invention to form a high quality composition. Some preferred ketoximes are, for example, acetoxime, methylethyl ketoxime, methylisobutyl ketoxime, cyclohexanone oxime, and the like.

One preferred blocked polyisocyanate which forms a high quality powder coating composition is 4,4'-methylene-bis-(cyclohexyl isocyanate) blocked with methylethyl ketoxime. Another is isophorone diisocyanate blocked with methylethyl ketoxime or caprolactam.

The powder coating composition of this invention contains about 10–30% by weight of a hydroxy functional plasticizer or a mixture of these plasticizers. These platicizers are cross-linked with the other constituents in the novel powder coating composition and provide a high quality finish. Typical hydroxy polyesters that are utilized have a weight average molecular weight of about 500–6,000 and a hydroxyl number of 18–300 and are polyesters of an alkylene polyol and a dicarboxylic acid or acid mixtures such as mixtures of aliphatic, alicyclic or aromatic dicarboxylic acids. Typical polyesters are as follows: adipic acid/butanediol-/ethylene glycol; phthalic anhydride/butanediol/ethylene glycol; and adipic acid/neopentyl glycol/ethylene glycol, adipic acid/neopentyl glycol, adipic acid/azelaic acid/isophthalic acid/ethylene glycol azelaic acid-/isophthalic acid/ethylene glocol and trimethylol propane/phthalic anhydride/hexhydrophthalic anhydride. Hydroxyl terminated polycaprolactones can also be used as plasticizers.

About 0–6% of other non-reactive monomeric and polymeric plasticizers can be used in the powder coating composition of this invention. Phthalate ester plasticizers, in particular, the alkyl and cycloalkyl ester phthalates in which the alkyl group has 2–10 carbon atoms can be used such as diethyl phthalate, dibutyl phthalate, didecyl phthalate, butylbenzyl phthalate, dicyclohexyl phthalate, and mixtures thereof. Other esters such as tricresyl phosphate, diethyl adipate and sucrose benzoate can also be used.

Non-reactive polyester resins can also be used as plasticizers. Typical polyesters are, for example, alkylene glycol esters of adipic and benzoic acid such as ethylene glycol adipate benzoate, neopentyl glycol adipate benzoate, ethylene glycol adipate benzoate phthalate and the like. Plasticizers of oil free or oil modified alkyd resins and polyesters and epoxidized soya bean oil can also be used.

Generally, the composition is formulated such that the molar ratio of NCO groups to hydroxyl groups of all the constituents used in the composition is about 0.9/1 to about 1.3/1. Preferably, to form a composition in which substantially all of the groups react, a 1/1 to 1.2/1 ratio is used.

A catalytic amount of an organometallic compound is used in the powder coating composition to accelerate cross-linking and curing of the finish after application and baking. Generally, about 0.02–2.0% by weight of the organometallic compound is used. Typically useful compounds are as follows: the organo tin catalyst, such as dibutyl tin dilaurate, dibutyl tin di-2-ethylhexoate; stannous octoate, stannous oleate and the like; zinc naphthenate, cobalt naphthenate, vanadium acetyl acetonate, zirconium acetyl acetonate, acetyl acetonate titanate and the like.

A silicone resin can be added to the powder coating composition of this invention to enhance flow and reduce cratering. Any of the conventional silicone resins or oils in amounts of 0.01–2% by weight can be used for this purpose.

Generally, the powder coating is pigmented and the following are examples of the great variety of pigments which can be used in the powder coating composition: metallic oxide, preferably titanium dioxide, zinc oxide, iron oxide, and the like, metallic flake, such as aluminum flake, metallic powders, metal hydroxides, "Afflair" pigments, for example, mica flake coated with titanium dioxide, sulfides, sulfates, carbonates, carbon black, silica, talc, china clay, and other extender pigments, organic pigments and lakes.

PREPARATION OF THE NOVEL POWDER COATING COMPOSITION

To prepare the novel powder coating composition of this invention, the acrylic polymer solutions, beads or emulsions are blended with blocked polyisocyanate, hydroxy functional plasticizers and optionally, cellulose acetate bytyrate and any other plasticizers and the organometallic compound along with pigments, pigment dispersions and other additives such as the aforementioned silicone resin and the like. The resulting mixture is then spray dried to form a powder and the powder then can be further dried in a vacuum over for 6–36 hours. The powder then is passed through a sieve with openings of about 100 microns but generally a 53 micron sieve is used to remove large particles.

In another technique to prepare the powder coating, the above prepared mixture is charged into a vacuum extruder or mixer. The extruder is operated under a vacuum of about 22–25 inches of mercury, and a temperature of about 60° to 90° C. and the solvent or water is removed from the composition and a 100% dried product or extrudate is produced. The extrudate or dried product is then ground to a powder using conventional grinding equipment, for example, a pin disc mill, a fluid energy mill or a hammer mill can be used. After grinding, the powder is passed through a sieve to remove large particles.

A two-roll mill is another technique that can be used to prepare the powder composition. Pigment chips or pigment dispersion, the acrylic polymer dispersions or solutions blocked polyisocyanate, plasticizer and, optionally, cellulose acetate butyrate and organometallic compound and any other additives are charged into a two-roll mill and milled together. The resulting composition is then ground and passed through a sieve to form the powder coating composition.

The pigment dispersions utilized in powder coating compositions of this invention are prepared by conventional techniques such as sand grinding, pebble milling, ball milling and the like of the acrylic polymer solution or dispersion with the above pigments.

Another method for preparing a pigment dispersion is a two roll mill. It is used to prepare pigment chips which are then formed into a pigment dispersion. Generally, the pigments and one of the acrylic polymers or cellulose acetate butyrate along with volatile non-solvents for the polymer and plasticizer are blended together and then the mixture is placed on a two-roll mill and the mixture is thoroughly milled to disperse the pigments and form pigment chips. These chips are then blended with a solvent to form a pigment dispersion which is utilized as indicated above.

Optionally, about 0.1–2.0% by weight of finely divided silica or silane treated silica can be blended with the novel powder coating composition of this invention to eliminate caking of the powder and improve its handling and spraying properties.

APPLICATION OF THE POWDER COATING COMPOSITION

The powder coating composition of this invention is then applied to a metal, glass, plastic or fiber reinforced plastic substrate by electrostatic spraying techniques or by using a fluidized bed or an electrostatic fluidized bed. Preferably, electrostatic spraying is utilized in which a voltage of 20 to 100 kilovolts is applied to the gun. The composition is applied in several passages and then baked at 120°–180° C. for 15–45 minutes. The resulting film is about 0.5–6 mils thick, but preferably, 2–3 mil films are used to provide a good quality finish.

Preferably, the coating composition of this invention is applied over a suitably treated and primed metal substrate or a primed and sealed metal substrate. Typical alkyd primers or epoxy primers pigmented with iron oxide, carbon black, titanium dioxide and the like can be used. Conventional epoxy sealers can also be used. The novel composition can be used directly over galvanized or phosphatized steel to form a durable coating. An electrically conductive carbon black pigment preferably is added to the primer or to the sealer to make the surface conductive and promote uniform deposition of the powder while spraying.

One useful sealer composition is pigmented with cabon black pigment and uses a hydroxypropyl methacrylate acrylin resin as a 3-(2-methylacryloxy ethyl)-2,2-spirocyclohexyl oxazolidine acrylic resin.

Electrodeposited primers can be used on the metal substrate. Typical electrodeposited primers composition have as the film-forming constituents about 50–95% by weight of a carboxylic acid polymer having an acid number of 5–200 and correspondingly about 5–50% by weight of a cross-linking agent.

The following are examples of carboxylic polymers used in these primer compositions; maleinized drying oils which are the reaction products of maleic anhydride and a drying oil such as linseed oil, dehydrated castor oil, tung oil, soya bean oil and the like; alkyd resins which are the reaction products of a polyhydric alcohol and a polybasic acid such as, drying oil fatty acids; esterified epoxy resins such as, an epoxy-hydroxy polyether resin esterified with conventional drying oil fatty acid which can be further acidified with maleinized drying oils; acrylic polymers; polyesters; trimellitic anhydride alkyd resins; strene/allyl alcohol copolymers reacted with a carboxylic acid constituent and the like.

The following are typical cross-linking agents used with the above carboxylic polymers to form conventional primers and primers that can be electrodeposited; melamine formaldehyde, alkylated melamine formaldehyde, urea formaldehyde, benzoguanamine formaldehyde, toluene sulfonamide resins; one preferred cross-linking agent is hexa(methoxymethyl)melamine. Other cross-linking agents such as, amines and other compatible hydroxyl terminated compounds can also be used.

The following Examples illustrate the invention. All quantities are on a weight basis unless otherwise indicated.

EXAMPLE 1

Soft Acrylic Polymer Solution A

A soft acrylic polymer solution is prepared as follows:

|  | Grams |
|---|---|
| Portion 1 | |
| Methyl methacrylate monomer | 290.00 |
| Butyl acrylate monomer | 446.00 |
| 2-Hydroxyethyl acrylate monomer | 34.00 |
| Methylethyl ketone | 270.00 |
| Lauryl mercaptan | 8.70 |
| Portion 2 | |
| Azo-bis-isobutyronitrile | 0.28 |
| Methylethyl ketone | 20.00 |
| | 1068.98 |

The constituents of Portion 1 are mixed together. Portion 1 is charged into a polymerization vessel equipped with a thermometer, stirrer, reflux condenser, addition funnel and a heating mantle and the ingredients are heated to 98° C. and then Portion 2 is mixed and then added to the polymerization vessel to form a reaction mixture.

A monomer solution and a solvent catalyst solution are prepared as follows:

|  | Grams |
|---|---|
| Monomer Solution | |
| Methyl methacrylate monomer | 523.0 |
| Butyl acrylate monomer | 240.0 |
| 2-Hydroxyethyl acrylate monomer | 61.0 |
| Lauryl mercaptan | 5.7 |
| | 829.7 |
| Solvent Catalyst Solution | |
| Methylethyl ketone | 48.0 |
| Toluene | 201.0 |
| Azo-bis-isobutyronitrile | 11.1 |
| | 260.1 |

The above prepared monomer solution and solvent catalyst solution are added to the reaction mixture over the following time periods while the reaction mixture is maintained during these addition periods at about 90° C. In each case, the monomer solution and the solvent catalyst solution are premixed before addition to the reaction mixture. The following table shows a time over which each of the additions of monomer and solvent catalyst solution is made.

| Time (Minutes) | Monomer Solution (Cubic Centimeters) | Solvent Catalyst Solution (Cubic Centimeters) |
|---|---|---|
| 2.5–15 | 92 | 32 |
| 15–30 | 110 | 36 |
| 30–45 | 110 | 25 |
| 45–60 | 110 | 20 |
| 60–90 | 220 | 67 |
| 90–150 | 182 | 15 |
| 120–150 | 0 | 65.1 |

After the above ingredients are added, the reaction mixture is maintained at about 85° C. for an additional 15 minutes and then diluted with 751 grams of acetone. The resulting polymer solution has a solids content of 54.3%.

The resulting polymer has a methyl methacrylate/butyl acrylate/hydroxyethyl acrylate weight ratio of 51/43/6. The polymer has a number average molecular weight of 17,000 and a weight average moleuclar weight of about 35,000 determined by gel permeation chromotography using polymethyl methacrylate as a standard and a calculated glass transition temperature of 9° C.

A Hard Acrylic Polymer Solution B

A hard acrylic polymer solution is prepared as follows:

| | Grams |
|---|---|
| Portion 1 | |
| Methyl methacrylate monomer | 857.00 |
| Hydroxypropyl methacrylate monomer (68–75% of 2-hydroxypropyl methacrylate and 25–32% of 1-methyl-2-hydroxyethyl methacrylate) | 110.00 |
| Lauryl methacrylate monomer | 45.40 |
| Acetone | 134.00 |
| Methylethyl ketone | 491.00 |
| 2-Mercapto ethanol | 26.90 |
| Portion 2 | |
| Methylethyl ketone | 20.00 |
| Azo-bis-isobutyronitrile | 0.41 |
| | 1684.71 |

The constituents of Portion 1 are mixed together and Portion 1 is charged into a polymerization vessel equipped as above. Portion 2 is then mixed and added to the polmerization vessel and heated to about 85° C. to form a reaction mixture.

The following monomer and catalyst feed solutions are prepared by blending the constituents together:

| | Grams |
|---|---|
| Feed Solution 1 | |
| Methyl methacrylate monomer | 152.00 |
| Hydroxypropyl methacrylate monomer (described above) | 19.40 |
| Lauryl methacrylate monomer | 7.80 |
| Azo-bis-isobutronitrile | 1.52 |
| | 180.72 |
| Feed Solution 2 | |
| Methyl methacrylate monomer | 248.0 |
| Hydroxypropyl methacrylate monomer (described above) | 30.5 |
| Lauryl methacrylate monomer | 13.0 |
| Acetone | 12.0 |
| Azo-bis-isobutyronitrile | 2.8 |
| | 306.3 |
| Feed Solution 3 | |
| Methyl methacrylate monomer | 137.0 |
| Hydroxypropyl methacrylate monomer (described above) | 14.1 |
| Lauryl methacrylate monomer | 5.9 |
| Azo-bis-isobutyronitrile | 16.0 |
| | 173.0 |

Feed Solution 1 is charged into the polymerization vessel at a feed rate of about 3.5 cubic centimeters per minute over about a 60-minute period while maintaining the reaction mixture at about 85° C. Feed Solution 2 is then added at a rate of about 7.3 cubic centimeters per minute over the next 60 minutes while maintaining the temperature of the reaction mixtures at about 82° C. Feed Solution 3 is then added at a rate of about 2.9 cubic centimeters per minute over the next 65 minutes while maintaining the reaction mixture at about 81° C. After Feed Solution 3 is added, the reaction mixture is held at about 78° C. for 20 minutes and then cooled to room temperature and diluted with a mixture of 400 grams of acetone and 225 of methylethyl ketone. The resulting polymer solution has a solids content of 5.5%.

The polymer has a methyl methacrylate/lauryl methacrylate/hydroxypropyl methacrylate weight ratio of 85/4.5/10.5. The polymer has a number average molecular weight of 7000, a weight average molecular weight of 13,000 determined by gel permeation chromotography using polymer methacrylate as a standard and a calculated glass transition temperature of 101° C.

A black mill base is prepared as follows:

| | Grams |
|---|---|
| Polymer solution (50% solids of a polymer of methyl methacrylate/lauryl methacrylate/ 2-hydroxy ethyl acrylate in a weight ratio of 90.4/3.3/6.3 in a solvent mixture of toluene/methylethyl ketone/acetone) | 470.4 |
| Methylethyl ketone | 366.3 |
| Toluene | 194.8 |
| Ethylene glycol monoethylether acetate | 88.5 |
| Carbon black chip (homogeneous chip of "Peerless" 155 carbon black pigment/ cellulose acetate butyrate having a 55% butyryl content and a viscosity of 0.02 seconds/Polymeric Dispersant* in a weight ratio of 20/64/16) | 288.0 |
| | 1408.0 |

*Polymeric Dispersant - polymer of methylmethacrylate/butyl-acrylate (44/56 ratio) having a weight average molecular weight of about 4,000 and is reacted with the biuret of hexamethylene diisocyanate and capped with ammonia.

The above constituents are charged into a mixer and blended for about 1 hour to dissolve the chips. Weight loss due to vaporation of solvent is made up with a mixture of methylethyl ketone/toluene mixture in a 2/1 weight ratio. The resulting composition is then set into an ice bath and stirred with an Eppenbach Homomixer for about 1 hour to form the mill base.

A yellow mill base is prepared as follows:

| | Grams |
|---|---|
| Polymer Solution (described in above black mill base) | 383.0 |
| Methylethyl ketone | 317.9 |
| Toluene | 168.5 |
| Ethylene glycol monoethylether acetate | 75.3 |
| Yellowchip (Irgazin yellow pigment/ cellulose acetate butyrate, 55% butyryl content and 0.02 second viscosity/butyl benzyl phthalate in a weight ratio of 47/48/5) | 255.3 |
| | 1200.0 |

The above ingredients are stirred together for 30 minutes and then stirred for 1 hour with an Eppenbach Homomixer to form the mill base. A liquid composition is then prepared as follows:

| | Parts by Weight |
|---|---|
| Soft Acrylic Polymer Solution A (prepared above) | 110.0 |
| Hard Acrylic Polymer Solution B (prepared above) | 275.0 |
| Polycaprolactone (hydroxyl terminated polymer having a number average molecular weight of about 1250) | 33.0 |
| Isophorone diisocyanate blocked with caprolactam | 45.0 |
| Low molecular weight silicone resin | 0.9 |
| Green Mill Base (10% "Monastral" Green pigment-phthalocyanine green; 16% polymer of 90.4% methyl methacrylate, 6.3% 2-hydroxyethyl acrylate, 3.3% lauryl methacrylate; 10.2% of cellulose acetate butyrate having a 55% butyryl content and a 0.02 second viscosity; 1.1% of butyl benzyl phthalate; all dissolved in 63.7% of a solvent mixture of methylethyl ketone, toluene and ethylene glycol monoethylether acetate) | 37.8 |
| Black Mill Base (prepared above) | 40.5 |
| Yellow Mill Base (prepared above) | 59.0 |
| White Mill Base (44.70% titanium dioxide; 22.35% of a polymer of 90.4% methyl methacrylate/6.3% 2-hydroxyethyl acrylate/ | |

-continued

| | Parts by Weight |
|---|---|
| 3.3% lauryl methacrylate dispersed in 33.95% of a solvent of methylethyl ketone) | 2.9 |
| Dibutyl tin dilaurate solution (4% solids solution in toluene) | 12.0 |
| | 616.1 |

The above constituents are thoroughly blended together and reduced with acetone to a 40 second visocosity measured with a No. 1 Zahn cup at 25° C. The resulting composition is sprayed dried by spraying the composition with a suction-type gun at 80 pounds per square inch pressure into a 30-gallon stainless steel drum that is open at both ends and placed in a horizontal position. One end of the drum is covered with a 140 mesh nylon cloth to retain the powder particles and the oher end of the drum with polyethylene having one opening therein through which the powder is sprayed. The powder is then placed into a vacuum oven for 48 hours and dried. The powder is passed through a 270 mesh sieve to remove any large particles. The resulting powder coating composition has relatively uniform particles and the particles do not adhere to each other.

The powder is then sprayed onto a six 20 gauge phosphatized steel panel using a model 322 Ransburg electrostatic powder gun. The powder is delivered from a resevior to the gun by means of an air stream. The gun utilizes 50 kilovolts of the electricity to charge the powder particles. The panels then are baked and the film thickness, gloss at 20° and distinctness of image are measured for each of the panels. The results are as follows:

| Panel | Baking Conditions | Film Thickness | 20° Gloss | Distinctness Of Image |
|---|---|---|---|---|
| 1 | 172° C. for 15 minutes | 2.4 mils | 78 | 7 |
| 2 | 144° C. for 20 minutes and 171° C. for 30 minutes | 2.0 mils | 80 | 6 |
| 3 | 144° C. for 20 minutes and 163° C. for 55 minutes | 2.5 mils | 82 | 7 |
| 4 | 150° C. for 15 minutes and 171° C. for 30 minutes | 3.0 mils | 85 | 8 |
| 5 | 150° C. for 15 minutes and 171° C. for 55 minutes | 3.5 mils | 85 | 8 |
| 6 | 150° C. for 20 minutes and 170° C. for 60 minutes | 2.6 mils | 87 | 8+ |

A 20° gloss above 40 is acceptable and a Distinctness of Image Value 3 is acceptable. Each of the panels have a smooth even finish with an excellent appearance.

EXAMPLE 2

The following mill bases are prepared:

| Blue Mill Base I | Parts by Weight |
|---|---|
| Portion 1 | |
| Phthalocyanine Blue Pigment Chip (homogeneous chip of 47 parts of phthalocyanine blue pigment, 5 parts butyl benzyl phthalate, and 48 parts of cellulose acetate butyrate having a 55% butyryl content and a viscosity of 0.02 seconds) | 1000 |
| Hard Acrylic Polymer Solution C (55.7% solids of a polymer of 89% methyl methacrylate, 3.3% lauryl methacrylate, 6.7% of 2-hydroxyethyl acrylate and containing .1% of 2-mercaptoethanol and having a weight average molecular weight of 11,000 and a glass transition temperature of 81° C. in an organic solvent mixture) | 2016 |
| Ethylene glycol monoethyl ether acetate | 500 |
| Portion II | |
| Methylethyl ketone | 2000 |
| | 5516 |

Portion I is stirred until the chip dissolves, then Portion II is added and thoroughly mixed with Portion I. The resulting mixture is ground in a conventional sand mill at a rate of 1 gallon per hour to uniformly disperse the pigment. The mixture is passed through the sand mill twice. The resulting mill base has a 36.7% solids content.

| Aluminum Flake Mill Base | Parts By Weight |
|---|---|
| Portion I | |
| Aluminum Paste (51.8% aluminum flake in ethylene glycol monoethyl ether acetate) | 96.60 |
| Hard Acrylic Polymer Solution C (described above) | 215.03 |
| Portion II | |
| Hard Acrylic Polymer Solution C | 196.90 |
| | 508.53 |

Portion I is stirred for 2 hours then Portion II is added and stirred for 3 hours. The resulting mill base has a 50% solids content and an aluminum flake content of 9.8% and a polymer content of 40.2%.

| Blue Mill Base II | Parts By Weight |
|---|---|
| Portion I | |
| Phthalocyanine Blue Chip (described above) | 1080 |
| Hard Acrylic Polymer Solution B (described in Example 1) | 1930 |
| Ethylene glycol monoethyl ether acetate | 500 |
| Portion II | |
| Methylethyl ketone | 1890 |
| | 5400 |

Portion I is stirred for 2 hours. Portion II is added and stirred for an additional 2 hours. The resulting mixture is passed through a sand mill twice at a rate of 1 gallon per hour to uniformly disperse the pigments and form a mill base.

| Black Mill Base | Parts By Weight |
|---|---|
| Hard Acrylic Polymer Solution C (described above) | 2352.0 |
| Methylethyl ketone | 1834.5 |
| Toluene | 974.0 |
| Ethylene glycol monoethyl ether acetate | 442.5 |
| Carbon black chip (described in Example 1) | 1400.0 |

| Black Mill Base | Parts By Weight |
|---|---|
| | 7003.0 |

The above ingredients are mixed together until the chip dissolves and then ground in a convention sand mill at a rate of 1 gallon per hour using 2 passes through the mill to form the mill base.

A liquid coating composition is prepared as follows:

| | Parts By Weight |
|---|---|
| Hard Acrylic Polymer Solution C (described above) | 187.00 |
| Soft Acrylic Polymer Solution D (52.8% solids of a polymer of 52% methyl methacrylate, 42% n-butyl acrylate and 6% 2-hydroxy ethyl acrylate having a weight average molecular weight of 20,000 and a calculated glass transition temperature of 9° C. | 21.60 |
| Polyester Plasticizer Solution (50% solids in an organic solvent of a hydroxy polyester of ethylene glycol/azelate/isophthalate/adipate having a hydroxyl no. of 35 and a number average molecular weight of about 3200) | 74.0 |
| Blocked polyisocyanate solution (34.9% solids in methylethyl ketone of 4,4'-methylene-bis-(cyclohexyl isocyanate) blocked with methylethyl ketoxime) | 108.9 |
| Cellulose acetate butyrate solution (25% solids in a 1/1 methylethyl ketone/toluene solvent of cellulose acetate butyrate having a 55% butyryl content and a 0.02 second viscosity) | 12.0 |
| Dibutyl tin dilaurate solution (5% solids in toluene) | 4.0 |
| Silicone oil (low molecular silicone oil) | 0.6 |
| Blue Mill Base I (prepared above) | 46.4 |
| Blue Mill Base II (prepared above) | 18.2 |
| Black Mill Base (prepared above) | 2.1 |
| Aluminum Flake Mill Base (prepared above) | 20.0 |
| Total | 494.8 |

The above constituents are thoroughly blended together and reduced with acetone to a 40 second viscosity measured with a No. 1 Zahn cup at 25° C. The resulting composition is sprayed-dried as in Example 1 and dried in a vacuum oven as in Example 1. The powder is then passed through a 270 mesh sieve to remove any large particles. The resulting powder coating composition has relatively uniform particles and the particles do not adhere to each other.

The powder is then sprayed onto phosphatized steel panels using the electrostatic powder gun and the application procedure of Example 1. The panels then are baked at 172° C. for 30 minutes to form a glossy, smooth, even finish that has good durability, weatherability, scratch and mar resistance and good chip resistance.

EXAMPLE 3

A liquid coating composition is prepared as follows:

| | Parts By Weight |
|---|---|
| Hard Acrylic Polymer Solution E (55.7% solids of a polymer of 88% methyl methacrylate/12% hydroxypropyl methacrylate and having a weight average molecular weight of about 6000 and a glass transition temperature of 103° C. in acetone solvent) | 90.50 |
| Soft Acrylic Polymer Solution F (52.8% solids of a polymer of 52% methyl methacrylate/42% n-butyl acrylate/6% 2-hydroxy ethyl acrylate having a weight average molecular weight of 20,000 and a glass transition temperature of 9° C in an organic solvent) | 15.67 |
| Cellulose acetate butyrate solution (25% solids of in acetone of cellulose acetate butyrate having a 55% butyryl content and a 0.02 second viscosity) | 0.47 |
| Polyester plasticizer solution (described in Example 2) | 42.77 |
| Blocked polyisocyanate solution (50% solids solution in acetone of isophorone diisocyanate blocked with methylethyl ketoxime) | 45.18 |
| Silicone oil (described in Example 2) | 0.48 |
| Dibutyl tin dilaurate solution (5% solids in toluene) | 0.18 |
| Midas Gold Mill Base (42.7% solids of 25% of Midas Gold iron oxide pigment, 22.5% cellulose acetate butyrate, described above, 2.5% butyl benzyl phthalate, 50% of hard acrylic polymer E, in a solvent mixture of ethylene glycol monoethyl ether acetate/methylethyl ketone in a 1 to 4 ratio) | 7.95 |
| Magenta Mill Base (41% solids of 23.5% of Monastral Magenta pigment RT 203D Quinacridon type pigment, 24% cellulose acetate butyrate, described above, 2.5% butyl benzyl phthalate, 50% of hard acrylic polymer E in a mixture of ethylene glycol monoethyl ether acetate/methylethyl ketone in a 1 to 4 ratio) | 7.65 |
| Maroon Mill Base (48.6% solids of 23.5% of Perrindo Maroon Deep R 6424 thioindigoid pigment 24% cellulose acetate butyrate, described above, 2.5% butyl benzyl phthalate, 50% of hard acrylic polymer E in a mixture of ethylene glycol monoethyl ether acetate/methylethyl ketone in a 1 to 4 ratio) | 23.86 |
| Aluminum Flake Mill Base (51% of the hard acrylic polymer E, 11.1% aluminum flake dispersed in an organic solvent mixture) | 1.02 |
| | 235.73 |

The above constituents are thoroughly blended together and reduced with acetone to a 40 second viscosity measured with a No. 1 Zahn cup at 25° C. The resulting composition is spray dried as in Example 1, dried in a vacuum oven and passed through a 270 mesh sieve as in Example 1. The resulting powder coating composition has relatively uniform particles and the particles do not adhere to each other.

The powder then is sprayed onto phosphatized steel panels using the electrostatic powder gun and the application procedure of Example 1. The panels then are baked at 172° C. for 30 minutes to form a glossy, smooth, even finish that has good durability, weatherability, hardness and has good mar and scratch resistance.

The invention claimed is:

1. A thermosetting polymer powder coating composition comprising finely divided particles having a particle size of 1–100 microns; wherein the particles consist essentially of an intimately mixed blend of
   A. 20–70% by weight of a hard acrylic polymer consisting essentially of
      1. 80–95% by weight, based on the weight of the acrylic polymer, of methyl methacrylate, styrene or a mixture of a methyl methacrylate and styrene, 2. 5–20% by weight, based on the weight of the acrylic polymer, of a hydroxy alkyl acrylate or hydroxy alkyl methacrylate having 2–4 carbon atoms in the alkyl groups or a mixture of said acrylate and said methacrylate;

wherein the hard acrylic polymer has a glass transition temperature of about 70°–103° C., a weight average molecular weight of 5,000–20,000 and a hydroxyl content of about 0.5–3% by weight.

B. 5–20% by weight of a soft acrylic polymer consisting essentially of
1. 30–62% by weight, based on the weight of the soft acrylic polymer, of methyl methacrylate, styrene or a mixture of methyl methacrylate and styrene;
2. 35–60% by weight, based on the weight of the soft acrylic polymer, of an alkyl acrylate having 2–12 carbon atoms in the alkyl group, an alkyl methacrylate having 4–12 carbon atoms in the alkyl group or a mixture of the above;
3. 3–10% by weight, based on the weight of the soft acrylic polymer of a hydroxy alkyl acrylate, a hydroxy alkyl methacrylate having 2–4 carbon atoms in the alkyl group or a mixture of the above;

wherein the soft acrylic polymer has a glass transition temperature of −20° to 15° C., a weight average molecular weight of 5,000–50,000 and a hydroxyl content of about 0.5–2% by weight;

C. 15–30% by weight of a blocked organic polyisocyanate of an organic polyisocyanate blocked with an organic ketoxime blocking agent; wherein the organic polyisocyanate is an aliphatic polyisocyanate or a cycloaliphatic polyisocyanate and the ketoxime blocked organic polyisocyanate is stable below 50° C. and breaks down under moderate baking conditions to provide reactive isocyanate groups;

D. 10–30% by weight of hydroxy functional plasticizer having a hydroxyl number of 18–300, and a number average molecular weight of about 500–6,000 and wherein the functional plasticizer is a polyester of an alkylene glycol or a mixture of alkylene glycols and an aliphatic, alicyclic or aromatic dicarboxylic acid or a mixture of these acids;

E. a catalytic amount of an organometallic compound;

wherein the molar ratio of NCO/OH for all of the above is about 0.9/1 to about 1.3/1.

2. The powder coating composition of claim 1 containing about 0.1–60% by weight, based on the weight of unpigmented powder coating, of pigment.

3. The powder coating composition of claim 2 in which the hard acrylic polymer consists essentially of 82–94% by weight of methyl methacrylate, 1–10% by weight of an alkyl acrylate or an alkyl methacrylate each having 2–14 carbon atoms in the alkyl groups and 5–17% by weight of a hydroxy alkyl acrylate or a hydroxy alkyl acrylate having 2–4 carbon atoms in the alkyl groups and in which the acrylic polymer has a weight average molecular weight of about 6,000–17,000 and a glass transition temperature of 80°–102° C.

4. The powder coating composition of claim 2 in which the soft acrylic polymer consists essentially of 45–60% by weight of methyl methacrylate, 35–45% by weight of an alkyl acrylate having 4–8 carbon atoms in the alkyl group and 5–10% by weight of a hydroxy alkyl acrylate or a hydroxy alkyl methacrylate having 2–4 carbon atoms in the alkyl group and in which the acrylic polymer has a weight average molecular weight of about 10,000–30,000.

5. The powder coating composition of claim 2 which contains, in addition, about 1–20% by weight of cellulose acetate butyrate has a butyryl content of 30–60% and a viscosity of about 0.005–2.0 seconds.

6. The powder coating composition of claim 2 in which the blocked organic polyisocyanate is either an aliphatic polyisocyanate or a cycloaliphatic polyisocyanate blocked with a ketoxime.

7. The powder coating composition of claim 2 containing 0.02–2.0% by weight, of an organic tin catalyst.

8. The powder coating composition of claim 2 in which
A. the hard acrylic polymer consisting essentially of 82–94% by weight of methyl methacrylate,
  1–10% by weight of an alkyl acrylate or or an alkyl methacrylate having 2–14 carbon atoms in the alkyl groups,
  5–17% by weight of a hydroxy alkyl acrylate or a hydroxy alkyl methacrylate having 2–4 carbon atoms in the alkyl groups;
and wherein the acrylic polymer has a weight average molecular weight of 6,000–17,000 and a glass transition temperature of 80°–102° C.;
B. a soft acrylic polymer consisting essentially of
  45–60% by weight of methyl methacrylate,
  35–45% by weight of an alkyl acrylate having 4–8 carbon atoms in the alkyl group, and
  5–10% by weight of a hydroxy alkyl methacrylate or a hydroxy alkyl acrylate having 2–4 carbon atoms in the alkyl group;
and wherein the acrylic polymer has a weight average molecular weight of 10,000–30,000 and
C. a blocked organic polyisocyanate in which the organic polyisocyanate is either an aliphatic polyisocyanate or a cycloaliphatic polyisocyanate and is blocked with a ketoxime;
D. a hydroxy functional plasticizer of a hydroxy polyester of an alkylene polyol and a mixture of aliphatic, alicyclic or aromatic dicarboxylic acids; and
E. an organo tin catalyst.

9. The powder coating composition of claim 2 in which
A. the hard acrylic polymer consists essentially of methyl methacrylate, lauryl metacrylate, hydroxy propyl methacrylate;
B. the soft acrylate polymer consists essentially of methyl methacrylate/butyl acrylate/hydroxy ethyl acrylate;
C. the blocked organic polyisocyanate is isophorone diisocyanate blocked with methyl ethyl ketoxime;
D. the hydroxy functional plasticizer is a polycaprolactone; and
E. the catalyst is dibutyl tin dilaurate.

10. The powder coating composition of claim 8 in which
A. the hard acrylic polymer consists essentially of methyl methacrylate, lauryl methacrylate and hydroxy ethyl acrylate;
B. The soft acrylic polymer consists essentially of methyl methacrylate/butyl acrylate/hydroxy ethyl acrylate;
C. the blocked organic polyisocyanate is 4,4′ methylene-bis-(cyclohexyl isocyanate) blocked with methylethyl ketoxime;

D. the hydroxy functional plasticizer is a hydroxy polyester of ethylene glycol/adipate/azelate/isophthalate; and E. the catalyst is dibutyl tin dilaurate.

11. The powder coating composition of claim 10 containing additionally 2–10% by weight of cellulose acetate butyrate.

12. The powder coating composition of claim 2 in which:

A. the hard acrylic polymer consists essentially of methyl methacrylate and hydroxy propyl methacrylate;

B. the soft acrylic polymer consists essentially of methyl methacrylate/butyl acrylate/hydroxy ethyl acrylate;

C. the blocked organic polyisocyanate is isophorone diisocyanate blocked with methylethyl ketoxime;

D. the hydroxy functional plasticizer is a hydroxy polyester of ethylene glycol/adipate/azelate/isophthalate; and E. the catalyst is dibutyl tin dilaurate.

* * * * *